C. H. SCHURR.
CUTTING TOOL.
APPLICATION FILED AUG. 20, 1917. RENEWED OCT. 17, 1919.
1,329,806.
Patented Feb. 3, 1920.
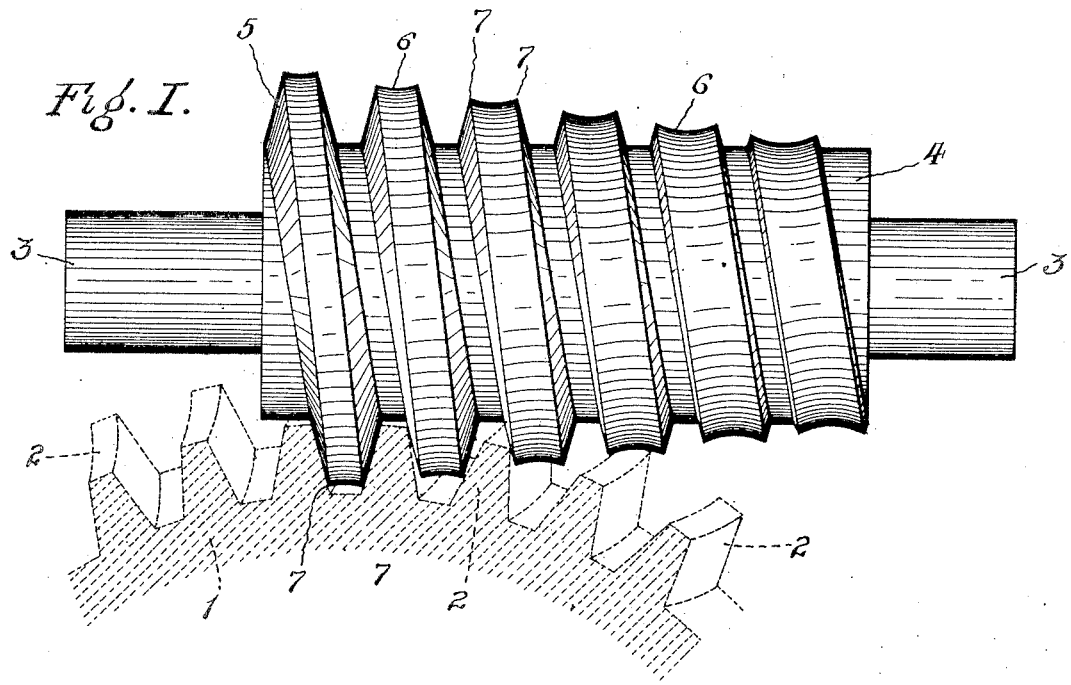
Fig. I.
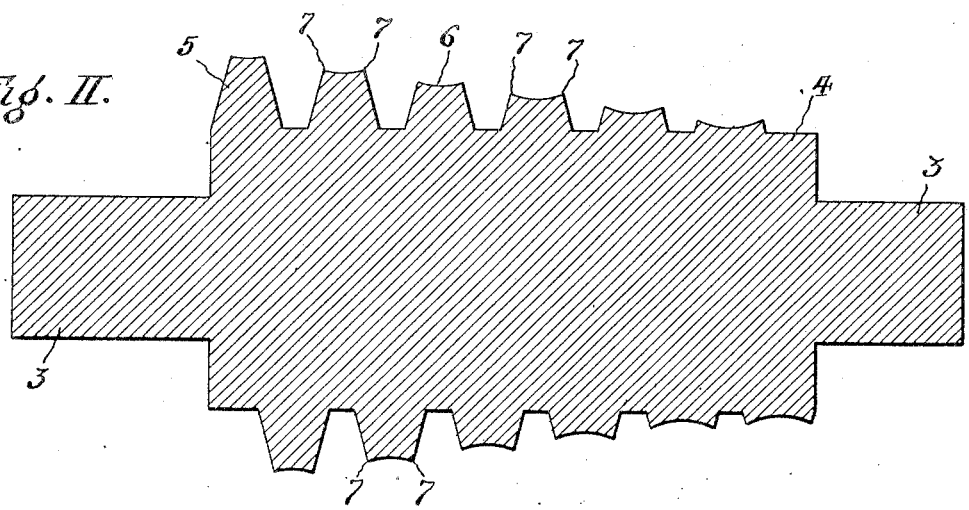
Fig. II.
Inventor
Charles H. Schurr
by his att'y,

UNITED STATES PATENT OFFICE.

CHARLES H. SCHURR, OF CLEVELAND, OHIO, ASSIGNOR TO THE LEES-BRADNER COMPANY, OF CLEVELAND, OHIO.

CUTTING-TOOL.

1,329,806.     Specification of Letters Patent.     Patented Feb. 3, 1920.

Application filed August 20, 1917, Serial No. 187,266. Renewed October 17, 1919. Serial No. 331,630.

*To all whom it may concern:*

Be it known that I, CHARLES H. SCHURR, a citizen of the United States, residing at 6210 Carnegie Ave., city of Cleveland, in the county of Cuyahoga and State of Ohio, have invented a new and useful Improvement in Cutting-Tools, of which the following is a specification, the principle of the invention being herein explained and the best mode in which I have contemplated applying that principle, so as to distinguish it from other inventions.

My invention appertains to a new kind of cutting tool and the particular exemplification of the drawing is a type adapted to cut worm wheel teeth according to the generating scheme of correlated rotations of the parts.

This application is a continuation of my earlier and copending application Serial No. 161,492 as to all matter common to the two applications.

The tool overall is of conical formation, but has a pair of duplicated spiral cutting edges, the purpose of which is best declared by reference to the method of its use. One object is to effect shearing cuts of any degree of delicacy and hence to attain a smoother finish. A further object is simultaneously to cut opposite sides of a tooth with infallible uniformity. In consequence of these objects this invention constitutes a modification of the invention of Ernest J. Lees represented by domestic Patent Number 1,168,402 of January 18, 1916.

I would have it clearly understood that in using the word "spiral" in the claims I have reference to a line composed of a series of convolutions of progressively varying diameter, or to what is sometimes spoken of as an advancing spiral. I therefore distinguish the meaning of the word spiral from the meaning of the word "helical" which latter I believe defines a curve composed of duplicated convolutions all of which are of like diameter.

I am aware moreover that I need not limit myself to this specific application or embodiment of my invention, which I have selected as a basis for illustrating and describing my invention merely for the purpose of rendering a clear and comprehensive understanding of the scope and novel features thereof.

Adverting to the drawing:

Figure I is an elevation of a tool embodying my invention showing the concluding position of its use upon a tooth of a dotted worm gear.

Fig. II is an axial section of the same showing the manner in which a cutter is enabled to effect its desired contour.

A part of a worm gear 1 having teeth 2 is illustrated in Fig. I. As is apparent each of the teeth is thicker at the roots and they all have concaved tops known as throats. The cutting tool comprises reduced ends or shanks 3 while in between the cutting edges are raised as winding lines about a bottom diameter 4 which as shown is of larger size than the shanks and substantially cylindrical. It is not necessarily either larger or cylindrical.

According to the selected exemplification the tool is of a single thread type, but tapered in a peculiar manner so that what may be referred to as convolutions are formed, each gradually varying in size of outside diameter. The entire screw formation has been designated by the numeral 5. It will be noticed that the top 6 is concaved and for the purpose of accentuating the pair of similar cutting edges 7. Owing to the tapered form to which the tool has been ground and to the fact that the thread is thinner at the top, the two cutting edges diverge or become farther spaced apart along any given line parallel to the axis which latter they would intersect if continued. Moreover, such points of intersection of the cutting edges 7 with a given axial plane of the tool are spaced like distances from such axis. It is this which enables the symmetry of cut from any adjacent pair of tooth faces of the worm wheel. The diameter and width of the bottom of the thread remains constant.

In operation the smaller end of the tool is caused to approach the worm wheel by movement in the direction of the axis of the tool until it presently starts to effect compound shearing cuts progressively nearer to the axis of the wheel. Thereafter the tool passes through as suggested by the position shown in Fig. I. The shearing cuts should be understood to be rather fine and are intended to be finishing or burnishing in the smoothness of result effected. Owing to the rotations having been correlated to a true generating action, and to the progressive cutting of the edges from adjacent tooth faces, a single passage or cycle of the tool suffices, and thereby the novelty of my invention is declared.

It is to be observed that my tool is fashioned with a raised portion or convolved projection or thread of varying outermost thickness. Lying in the outer surface of said thread and coinciding as to the direction of its extent with the thread's inclination are a pair of spiral cutting edges. The two spiral cutting edges would if continued both intersect the axis of the tool, but in approaching the axis diverge relatively to each other. They therefore converge as they recede from the axis. While the drawing illustrates continuous spiral cutting edges extending from one end of the thread to the other, it is to be understood that such edges may be feasibly interrupted by nicks or gashes. Clearly, the edges 7 define the extreme outer periphery of the thread. By the word "convolution" is meant one full turn about the axis or the length of any cutting edge starting in any axial plane and extending around the tool axis until it again intersects the same plane. The convolved projection or thread is of varying thickness measured in different arcs which are concentric with the pitch circle of the worm wheel with which it is adapted to have generating engagement. The recurrent pairs of points of intersection with a particular axial plane lie, each pair, in a line parallel to the axis of the tool. All such pairs of points lie in one or the other of a pair of converging lines. The thread comprises a plurality of continuous convolutions. Each of the cutting edges 7 may be said to comprise sections which lie in a single spiral line so that all of said sections are presented lengthwise to the inclination of the thread.

I claim:—

1. A worm wheel generating tool fashioned with a thread adapted for generating interaction with a worm wheel, said thread having cutting edge sections which lie in a single spiral line, said edge sections being presented lengthwise to the inclination of the thread.

2. A worm wheel generating tool having a convolved projection variously raised away from its axis, said projection fashioned with a plurality of continuous spiral cutting edges which extend from one end of the tool to the other.

3. A worm wheel generating tool having a thread provided with a plurality of cutting edges which converge in the direction in which the thread is wound about its axis.

4. A worm wheel generating tool formed with a convolved projection adapted for generating engagement with a toothed worm wheel blank, said projection having a plurality of cutting edges lying in the outer surface of said projection.

5. A worm wheel generating tool formed with a convolved projection adapted for generating engagement with a toothed worm wheel blank, said projection having spiral cutting edges which converge.

6. A worm wheel generating tool having converging cutting edges conforming to lines wound about an axis, each progressively spaced different distances from said axis, each such line further adapted as to direction to intersect said axis.

7. A worm wheel generating tool provided with a thread having a plurality of converging cutting edges confined to the extreme outer boundary of the thread and conforming to a curve wound about an axis and of progressively increasing diameter.

8. A worm wheel generating tool having a plurality of cutting edges spaced apart in a direction parallel to the axis and having points in a given line which is parallel to the axis spaced equal distances from such axis.

9. A worm wheel generating tool having a plurality of cutting edges conforming to lines wound about its axis, points of recurrent intersection of an adjacent pair of such edges with an axial plane of the tool being spaced apart a different distance than another distinct pair of adjacent edges when measured in each instance along a line parallel to the axis of the tool.

10. A worm wheel generating tool having a plurality of spiral cutting edges, points in a particular convolution of each of said edges respectively and lying in the same axial plane of the tool being moreover disposed in a line parallel to the axis of the tool.

11. A worm wheel generating tool having one of its axial planes intersected by a pair of cutting edges at points which are spaced equal distances from the axis of the tool and a given distance from each other, said edges having recurrent points of intersection with the same axial plane which points are spaced a correspondingly varying distance from said axis and from each other.

12. A worm wheel generating tool having a plurality of spiral cutting edges and depressed surfaces between all of said edges.

13. A tool of the character described having a pair of cutting edges conforming to lines wound about the axis of the tool both of said edges being projected farther from said axis than any other part of said tool between their points of intersection with any axial plane of the tool.

14. A worm wheel generating tool having a plurality of cutting edges wound about its axis, the points of intersection of said edges with an axial plane of said tool lying in lines converging in pairs in a direction away from the axis of the tool, each such pair of points in said converging lines respectively being spaced equal distances from said axis though variously from each other.

15. A worm wheel generating tool having a pair of cutting edges wound about its axis, the recurrent pairs of points of intersection of said edges with an axial plane of said tool lying different distances from said axis respectively in lines which converge in a direction away from the axis of the tool, the points of such intersection of any particular pair being equispaced from the axis.

16. A worm wheel generating tool having a convolved projection provided with a pair of curved cutting edges accentuated by a cavity therebetween.

17. A worm wheel generating tool comprising a convolved projection having its top widening in a direction toward one end and the recurrent intersections of said top with any axial plane being a concave line.

18. A worm wheel generating tool provided with a convolved projection having a cutting edge and its top concave adjacent such edge, said edge furthermore depressed toward the axis of the tool relative to the top of another portion of said tooth.

19. A worm wheel generating tool provided with a convolved projection having a pair of cutting edges and its top concave in between such edges, one pair of points of said edges in a given plane spaced equal distances from, and other pairs of points of said edges in the same plane being progressively depressed in pairs toward the axis of the tool.

20. A worm wheel generating tool having a pair of cutting edges conforming to lines wound about an axis, which edges while converging toward said axis diverge relatively to each other.

21. A worm wheel generating tool formed with a spirally convolved projection having a pair of spiral cutting edges which converge with respect to each other as they recede from the axis of convolution.

22. A worm wheel generating tool having a pair of spiral cutting edges which intersect a given axial plane at a pair of points which are equidistant from the axis.

23. A worm wheel generating tool having a pair of spiral cutting edges intersecting a particular axial plane repeatedly at pairs of points, such pairs of points of intersection of any particular convolution being equidistant from the axis, the pair of points of intersection of one convolution being a different distance from the axis than the pair of points of intersection of another convolution.

24. A worm wheel generating tool provided with a thread formed with a pair of spiral cutting edges, the points of intersection of said edges with a particular axial plane being equidistant from the axis, the pairs of points of intersection of said edges with a particular axial plane being variously spaced from each other in a direction parallel to the axis.

25. A worm wheel generating tool formed with a thread having a pair of continuous cutting edges which conform to spiral lines, said edges intersecting a given axial plane at a pair of points equal distances from the axis, said edges intersecting the same axial plane at another pair of points which are equal distances from the axis but a different distance from the axis than are the first mentioned pair of points of intersection respectively.

26. A worm wheel generating tool provided with a thread having a plurality of cutting edges lying wholly within its periphery and all such edges extending in a direction around the tool axis.

27. A worm wheel generating tool formed with a convolved projection adapted for generating engagement with a toothed worm wheel blank, said projection being fashioned with spiral cutting edges.

28. A worm wheel generating tool formed with a convolved projection adapted for generating engagement with a toothed worm wheel blank, said projection being fashioned with a pair of spiral cutting edges wound about the axis of convolution and extending from one end of said projection to the other.

29. A worm wheel generating tool formed with a convolved projection adapted for generating engagement with a toothed worm wheel blank, said projection being fashioned with a pair of spiral cutting edges wound about the axis of convolution and extending continuously in a direction along said axis.

30. A worm wheel generating tool having a convolved projection comprising a plurality of continuous convolutions and provided with a continuous cutting edge which conforms to a line receding from the axis of the tool and extending substantially from one end of said projection to its other end.

31. A worm wheel generating tool having a thread adapted for generating engagement with a toothed worm wheel blank, said thread having a cutting edge lying in the outer surface of said thread, said cutting edge furthermore having the same general direction as the inclination of said thread.

Signed by me, this 10th day of August, 1917.

CHARLES H. SCHURR.